United States Patent
Petty et al.

(10) Patent No.: US 6,395,856 B1
(45) Date of Patent: *May 28, 2002

(54) SILICONE OLIGOMERS AND CURABLE COMPOSITIONS CONTAINING SAME

(75) Inventors: Herbert E. Petty, Bethel, CT (US); Robert Pickwell, Tonawanda, NY (US); Frederick D. Osterholtz, Pleasantville, NY (US); Shiu-Chin Huang Su, Croton-on-Hudson, NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/445,080

(22) PCT Filed: Apr. 16, 1999

(86) PCT No.: PCT/US99/08533

§ 371 (c)(1),
(2), (4) Date: Dec. 2, 1999

§ 102(e) Date: Dec. 2, 1999

(87) PCT Pub. No.: WO99/54386

PCT Pub. Date: Oct. 28, 1999

Related U.S. Application Data

(63) Continuation of application No. 09/266,500, filed on Mar. 11, 1999, now Pat. No. 6,323,277, which is a continuation-in-part of application No. 09/062,047, filed on Apr. 17, 1998, now Pat. No. 6,140,445, and a continuation-in-part of application No. PCT/US98/17391, filed on Aug. 21, 1998.

(51) Int. Cl.$^7$ .............................................. C08G 77/08
(52) U.S. Cl. ............................. 528/24; 528/15; 528/18; 528/31; 528/32; 528/33; 528/35; 524/858; 524/860; 524/861; 524/862; 524/863; 525/100; 525/101; 525/102; 525/103; 525/105; 525/106; 522/99
(58) Field of Search ........................... 556/450; 528/15, 528/18, 24, 31, 32, 33, 35; 524/858, 860, 861, 862, 863; 525/100, 101, 102, 103, 105, 106; 522/99

(56) References Cited

U.S. PATENT DOCUMENTS

| | | |
|---|---|---|
| 4,179,537 A | 12/1979 | Rykowski |
| 4,499,150 A | 2/1985 | Dowbenko et al. |
| 4,499,151 A | 2/1985 | Dowbenko et al. |
| 4,753,976 A | 6/1988 | Yoshioka et al. |
| 4,877,661 A | 10/1989 | House et al. |
| 4,950,779 A | 8/1990 | Wengrovius et al. |
| 5,210,168 A | 5/1993 | Bergstrom elt al. |
| 5,282,998 A | 2/1994 | Horn et al. |
| 5,432,246 A | 7/1995 | Fenn et al. |
| 5,932,757 A | 8/1999 | Standke et al. |
| 5,982,041 A * | 11/1999 | Mitani et al. ............... 257/783 |
| 6,069,259 A * | 5/2000 | Crivello ..................... 549/214 |

FOREIGN PATENT DOCUMENTS

| | | |
|---|---|---|
| EP | 0 124 805 | 11/1984 |
| EP | 0 499 233 A2 | 8/1992 |
| EP | 0 801 112 A2 | 10/1997 |
| EP | 0 890 598 A1 | 1/1999 |
| WO | 96/16125 | 5/1996 |
| WO | 97/25374 | 7/1997 |
| WO | 99 02580 | 1/1999 |

OTHER PUBLICATIONS

Derwent Abstract, JP 10252516, Matsumura et al. 9/98.*
Derwent Abstract, JP 07252362, Mitsubishi Chem Corp. 10/95.*

* cited by examiner

Primary Examiner—Robert Dawson
Assistant Examiner—Jeffrey B. Robertson
(74) Attorney, Agent, or Firm—Michael P. Dilworth

(57) ABSTRACT

Oligomers of the formula:

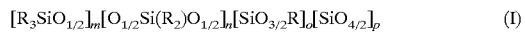

wherein
each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated aliphatic hydrocarbon group of 1 to 16 carbon atoms; each $R^2$ is independently a group as defined for $R^1$, an aromatic hydrocarbon group or an acyl group; each $R^3$ is independently a monovalent organic radical containing an aliphatically unsaturated hydrocarbon group and each $R^4$ is a monovalent organic radical linked to the Si atom of the siloxane oligomer backbone by an Si—C bond, which does not include an aliphatically unsaturated hydrocarbon group and which has thereon one or more members of the group selected from aromatic hydrocarbon, ether, ester, carbamate, thioether, polysulfide, blocked mercaptan, amide, epoxy, cyano and oximato groups; and with the provisos that
at least one quarter of all R groups are —$OR^2$; either at least one silicon atom of the oligomer has an $R^3$ group thereon or at least one R is a B, or both; if there is a group $R^3$ which is a vinyl group, there is at least one other group which is a B group, an $R^3$ group other than vinyl, or an $R^4$ group; m=2 to 20; n=0 to 50; o=0 to 20; and p=0 to 10, are useful as coupling agents in curable compositions of filled organic polymers used for wire and cable insulation. The oligomers also have utility as crosslinkers, as adhesion promoters, to provide a dual radical/moisture cure mechanism, and/or to provide moisture resistance in coating, in other compositions, such as curable adhesives and coatings.

19 Claims, No Drawings

SILICONE OLIGOMERS AND CURABLE COMPOSITIONS CONTAINING SAME

CROSS REFERENCE TO RELATED APPLICATIONS

This application is a continuation of copending U.S. patent application Ser. No. 09/266,500, filed Mar. 11, 1999, now U.S. Pat. No. 6,323,277 which is a continuation-in-part of U.S. patent application Ser. No. 09/062,047, filed Apr. 17, 1998 now U.S. Pat. No. 6,140,445 and a continuation-in-part of PCT/US98/17391, filed Aug. 21, 1998, designating US, all of which are incorporated herein by reference.

BACKGROUND OF THE INVENTION

1. Field of the Invention

This invention relates to silicone oligomers useful as coupling agents, crosslinkers and adhesion promoters for curable compositions, for instance free-radically curable filler-organic elastomeric polymer compositions having special application as insulation coatings, to compositions employing the oligomers, and to cured products obtained therefrom.

2. Description of the Prior Art

Silanes are known as coupling agents, crosslinkers and adhesion promoters, and are quite useful in adhesives and coatings. Furthermore, a substantial amount of research has been performed heretofore in connection with silane compounds having a plurality of alkoxy groups and which are useful as coupling agents, crosslinkers and adhesion promoters.

For instance, U.S. Pat. No. 4,179,537 to Rykowski discloses blends of an organofunctional silane, e.g., vinyltrialkoxysilanes, methacryloxyalkyltrialkoxysilanes, vinyltrihalosilanes and the like with a non-organofunctional silane, e.g., alkyltrialkoxysilanes, and the incorporation of such blends into organic resins, e.g., EPDM rubber for improving the adhesion between inorganic substrates such as clay fillers and the resin. This patent fails to disclose, teach or suggest the incorporation of siloxane oligomers in the coupling composition and suggests that the presence of siloxane oligomers in the resin-filler system could have a detrimental effect on coupling efficiency (col. 4, lines 54–63).

Use of silanes having silicon-bonded 2-methoxyethoxy groups as coupling agents, e.g., vinyl-tris-(2-methoxyethoxy)silane (col. 2, lines 44–47) is also described in U.S. Pat. No 4,179,537. Vinyl-tris-(2-methoxyethoxy) silane, has been used industrially for many years as a coupling additive in mineral-filled EPM and EPDM wire and cable insulations. EPM is an ASTM designation for copolymers or ethylene and propylene; EPDM is a terpolymer of ethylene, propylene and a diene monomer such as ethylidene norbornene or 1,4 hexadiene. Vinyl-tris-(2-methoxyethoxy)silane has been extensively used heretofore because it provides a unique balance of elastomer reinforcement and the degree of wet electrical stability required. However, it releases 2-methoxyethanol as a hydrolysis by-product when it is used and, unfortunately, 2-methoxyethanol is now being studied as a suspected teratogen. Consequently coupling agent products based on vinyl-tris-(2-methoxyethoxy)silane are now facing continuing replacement pressure in the marketplace.

U.S. Pat. No 4,950,779, Wengrovius, et al. (General Electric), describes mixtures comprising cyclic, linear and branched alkoxy functional silicone oligomers produced by condensation of organotrialkoxysilanes, such as methyltrimethoxysilane and vinyltrimethoxysilane, using formic acid, optionally with a strong acid catalyst.

U.S. Pat. Nos. 4,499,150 and 4,499,151 teach a copolymer of an ethylenically unsaturated alkoxysilane with another ethylenically unsaturated group made by free radical polymerization. These interpolymers are limited in structure and functionalities because of the formulation chemistry.

U.S. Pat. No. 5,210,168 to Bergstrom et al. (Dow Corning) describes alkoxy functional silicone oligomer mixtures produced from organotrialkyoxysilanes using a carboxylic acid, such as formic acid, using a catalytic amount of a strong acid catalyst.

U.S. Pat. No. 5,282,998 to Horn et al. (Hüls), describes mixtures of linear and cyclic alkoxy functional silicone oligomers produced from vinyltrialkoxysilanes using hydrogen chloride catalyst and water.

U.S. Pat. No. 5,432,246 to Fenn et al. discloses a silane oligomer made from a secondary amino-alkoxy silane, a polyisocyanate and optionally a single isocyanate group. Such oligomers are based on the reaction of the amine with the isocyanate to form a substituted urea. In these oligomers, all the isocyanate groups have reacted with the amine groups, so no such functionalities are present. Further, urea structures may increase viscosity to an undesirable degree.

SUMMARY OF THE INVENTION

The present inventors have found novel silicone oligomers having a plurality of alkoxysilyl groups, and having either at least one unsaturated group attached thereon, or at least one organosilyl functional group bridged to a silicone atom of the oligomer backbone by an Si—C bond, or both. The unsaturated group may be vinyl or some other aliphatically unsaturated hydrocarbon functionality.

These silicone oligomers are useful as coupling agents, crosslinkers and adhesion promoters as well as for crosslinkable organic polymer/filler compositions such as wire cable insulating formulations, as well as other free-radically curable compositions. They have lower volatility than alkoxysilane compounds, making them easier to handle by formulators and potentially safer.

The silicone oligomers of the present invention may be of the formula

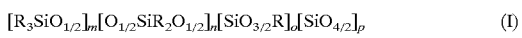

$$[R_3SiO_{1/2}]_m[O_{1/2}SiR_2O_{1/2}]_n[SiO_{3/2}R]_o[SiO_{4/2}]_p \qquad (I)$$

wherein each R is selected individually from the group consisting of B, $R^1$, —$OR^2$, $R^3$ and $R^4$; B is an organosilyl functional group bridged to the Si atom of the siloxane oligomer backbone by a Si—C bond; each $R^1$ is independently a saturated aliphatic hydrocarbon group of 1 to 16 carbon atoms; each $R^2$ is independently a group as defined for $R^1$ or an acyl or aromatic hydrocarbon group; each $R^3$ is independently a monovalent organic radical containing an aliphatically unsaturated hydrocarbon group and each $R^4$ is a monovalent organic radical linked to the Si atom of the siloxane oligomer backbone by a Si—C bond, which does not include an aliphatically unsaturated hydrocarbon group and which has thereon one or more members of the group selected from aromatic hydrocarbon, ether, ester, carbamate, thioether, polysulfide, blocked mercaptan, amide, epoxy, cyano or oximato groups; and with the provisos that at least one quarter of all R groups are —$OR^2$; either at least one silicon atom of the oligomer has an $R^3$ group thereon or at least one R is a B, or both; if there is a group $R^3$ which is a vinyl group, there is at least one other group which is a B group, an $R^3$ group other than vinyl, or an $R^4$ group; m=2 to 20; n=0 to 50; o=0 to 20; p=0 to 10.

In a further aspect, the invention is a curable composition comprising an oligomer of formula (I) wherein formula has at least one silicone atom of the oligomer which has an $R^3$ group and at least one R is a B. Such compositions may be formed by mixing concurrently or in any order of succession:

(1) an organic polymer curable by a free radical mechanism;

(2) an inorganic filler;

(3) a siloxane oligomer as described above.

Preferred compositions also include a free radical catalyst system capable of crosslinking the organic polymer. Coating and adhesive compositions which comprise the oligomers of formula (I) may also be prepared.

The siloxane oligomers may be produced with little or no volatiles. They function as suitable, cost effective, replacements for commercial coupling agents used in wire cable insulator formulations, with decreased health hazards.

A further aspect the invention is an article, at least a portion of which comprises a cured composition as described above. Preferred articles are wire cables comprising a conductor and a coating of insulation on the conductor, the coating comprising the cured composition as described above.

DETAILED DESCRIPTION OF THE INVENTION

All patents or other published documents mentioned anywhere herein are expressly incorporated herein by reference in their entirety.

Oligomer Structure

In structure I above, B is an organosilyl functional group, —A—W, which comprises a silyl group W and a divalent linking group A which is attached by an Si—C bonds to group W and to a silicon atom of the siloxane oligomer. Preferably B is internal (i.e. non-terminal) to the oligomer. In one preferred embodiment of the present invention, there is at least one B group per oligomer. For this particular embodiment, more preferably, there are at least two B groups per oligomer molecule. Usually, if a B group is attached to a silicon atom of the siloxane backbone, the other R group(s) on that silicon atom is an alkoxy group. If B is not present, then the oligomer will have ethylenic unsaturation as described below.

In the structure B, the divalent linking group A creates a non-siloxane bridge between the siloxane oligomer and the silyl group. The linking group A may contain hetero atoms in the structure so long as Si—C bonds are used at the ends of the linking group to form the respective connections the oligomer and to the silyl group W. The linking group may be linear, branched or cyclic and may be olefinically or aromatically unsaturated. The linking group may be, for instance, alkylene, alkarylalkylene or alkarylene, or it may be alkylene which is interrupted by hetero-atom containing organic structures such as ether, including polyether; ester, including polyester; carbamate, including polyurethane; isocyanurate; thioether; polysulfide, including disulfide and tetrasulfide; or the like. Preferably the linking group is an alkylene of 2 to 12 carbon atoms. The linking group A may be substituted with silyl or siloxy functions, as well as unsaturated groups. Indeed, group A may form part of a backbone with relatively linear siloxane chains attached to either end of the group. Examples of linking groups A include cycloaliphatic groups such as 1,4-diethylenecyclohexylene:

or 1,3,-diethylene-5-triethoxysilylethylcyclohexylene:

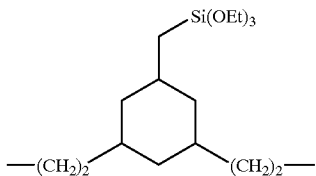

branched or linear aliphatic groups such as ethylene, 1,2-propylene, 1,3-propylene, 1,4-butylene, 1,3-butylene, 1,2-butylene or 2,2-dimethyl-1,3-propylene; arylene groups such as 1,4-phenylene; alkarylalkylene groups such as 1,4-diethylenephenylene:

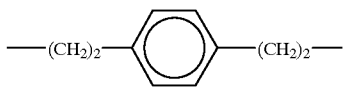

divalent polyether groups of the formula:

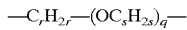

where q is 1–50, preferably 1–5; r and s are integers of 2–6; and divalent thioether or polysulfide-containing groups of the formula:

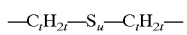

where t is 2–16, preferably 2–4, and u is 1–8, preferably 2–4. Preferably the linking group is an alkylene of 2 to 12 carbon atoms, more preferably 2–3 carbon atoms.

The silyl functional group W in the structure —AW may be a silyl group having hydrolyzable functionality, such as alkoxy or acetoxy functionality. Alternatively, the group W may be a silicon linked organosiloxane or polyorganosiloxane group. Preferably, the silyl group W is an alkoxysilyl group or a further siloxane oligomer of alkoxy silane monomers, more preferably a dialkoxysilyl and most preferably a trialkoxysilyl group.

A preferred B group may be represented as —$C_fH_{2f}SiR^1_g(X)_{3-g}$ wherein the structure —$C_fH_{2f}$ corresponds to A and the structure —$SiR^2_g(X)_{3-g}$ corresponds to W. Suitably, f=2 to 12, g=0 to 2, X is a hydrolyzable group such as halogen, oxime, alkoxy, aryloxy, alkenoxy or acetoxy and $R^1$ is as previously defined. More preferably f=2 to 6, g=0–1, X is methoxy, ethoxy or acetoxy, and $R^1$ is methyl. Exemplary B groups are —$C_2H_4Si(OCH_3)_3$; —$C_2H_4Si(OC_2H_5)_3$; —$C_2H_4Si(OCH_3)_2(CH_3)$; —$C_2H_4Si(OCH_3)_2Cl$; —$C_2H_4(C_6H_9)(C_2H_4Si(OCH_3)_3)_2$; —$C_2H_4(C_5H_8)C_2H_4Si(OC_2H_5)_3$; and —$C_2H_4Si(OCH_3)_2(OSi(OCH_3)_3)$.

$R^1$ is a saturated aliphatic hydrocarbon of 1 to 16 carbon atoms, e.g., alkyl (linear or branched), or cycloalkyl. Exemplary $R^1$ groups are methyl, ethyl, i-propyl, i-butyl, t-butyl, pentyl, cyclohexyl, octyl, decyl and dodecyl. Methyl and ethyl are preferred $R^1$ groups.

R² is a group as defined for R¹, an aromatic hydrocarbon group or an acyl group. Exemplary R² groups are methyl, ethyl, i-propyl, i-butyl, t-butyl, pentyl, cyclohexyl, octyl, decyl, dodecyl, phenyl, benzyl, napthyl, acetyl, benzoyl and propionyl. Preferably R² is methyl or ethyl, although if a non-volatilizing oligomer is desired some of the R² groups may suitably be dodecyl.

R³ is a monovalent organic group containing an aliphatically unsaturated hydrocarbon group. R³ may contain ethylenic or acetylenic unsaturation. Examples of R³ groups include vinyl, allyl, propargyl, acryloxyalkyl, methacryloxyalkyl, crotyloxyalkyl, styryl, n-octenyl, linolyl, lineoyl, etc. Vinyl, acryloxypropyl and methacryloxypropyl are preferred. Usually where a silicon atom has a R³ group, the other R group(s) on that silicon atom will be an —OR² group, preferably alkoxy. In a preferred embodiment of the present invention, there is at least one R³ group present. If B is not present, then R³ must be present. Both B and R³ may be present in one oligomeric structure. Furthermore, if there is a group R³ which is a vinyl group, there is at least one other group which is a B group, an R³ group other than vinyl, or an R⁴ group.

The R groups on the oligomer may also include one or more R⁴ groups. R⁴ is a monovalent organic radical linked to the Si atom of the siloxane oligomer backbone by an Si—C bond, which does not include an aliphatically unsaturated hydrocarbon group and which has one or more aromatic hydrocarbon, ether, ester, carbamate, isocyanurate, thioether, polysulfide, blocked mercaptan, amide, cyano, epoxy or oximato group thereon.

Exemplary aromatic hydrocarbon groups include phenyl, benzyl or napthyl.

Exemplary ether-containing groups include alkoxyethyl or alkoxypropyl and polyether groups, especially those obtained as a result of hydrosilation of an allyl-started poly(ethylene oxide), allyl-started polypropylene oxide or allyl-started EO/PO copolymer. Ether groups may also be provided by etherification of silylalkylhydroxides.

Exemplary ester containing groups are acetic acid, propionic acid, octanoic acid, benzoic acid, fatty acid, or acid terminated polyester, esters of hydroxyalkyl groups, for instance acetyloxypropyl, propionyloxypropyl, benzoyloxyethyl, and the like.

Exemplary carbamate containing groups may be groups obtained by reaction of silylalkylisocyanates with alcohols, and may include polyurethane as well an mono-carbamato structures. Specific such groups include propyl-N-carbamatoethyl; propyl-N-carbamatomethyl, ethyl-N-carbamatoethyl and propyl-N-carbamatoisopropyl.

Exemplary amide containing groups are suitably derived from aminoalkyl groups, amidized with a carboxylate ester such as methyl acetate, methyl propionate or a fatty acid ester, and the like. Specific such groups include 3-acetamidopropyl, 2-propionamidoethyl, 3-cocoamidopropyl.

Polysulfide encompasses groups having the functionality —$S_n$— therein where n is 2–8, preferably 2–4, especially disulfide and tetrasulfide. Specific such groups include: $C_4H_9$—SS—$C_3H_6$— and $C_2H_5$—SS—$C_2H_4$—.

Blocked mercaptans are functional groups produced by reaction of a mercapto group with a subsequently removable blocking agent. Exemplary blocked mercaptan groups include thioester and other groups disclosed in copending application PCT\US98\17391, filed Aug. 21, 1998, designating US.

Representative examples of silanes which may be incorporated into the oligomers to provide blocked mercaptan groups include 3-methyldiethoxysilylpropyl thioacetate, 3-trimethoxysilylpropyl thioacetate, 3-triethoxysilylpropyl thioacetate, 3-trimethoxysilylpropyl thiopropionate, 3-triethoxysilylpropyl thiobenzoate; 3-triethoxysilylethyl thioacetate, 3-triethoxysilylmethyl thioacetate, 3-triethoxysilylpropyl thiooctanoate, and other compounds listed in PCT\US98\17391, filed Aug. 21, 1998.

Cyano containing groups are exemplified by 3-cyanopropyl.

Epoxy-containing groups are exemplified by glycidoxypropyl and β-(3,4-epoxycyclohexyl)ethyl.

Preferably m+n+o+p<50, more preferably ≦45, even more preferably <30 and most preferably <15. In its broadest aspect, m=2 to 20, n=0 to 50, o=0 to 20 and p=0 to 10. Preferably, m=2 to 10, n=0 to 20, o=0 to 20 and p=0 to 10. More preferably m=2 to 10, n=0 to 20, o=0 to 10 and p=0 to 5. Even more preferably m is 2 to 4, n is to 1 to 15, o is 0 to 2 and p is 0 to 1, though it is understood there may be distributions of the number of siloxy units within a given oligomer batch. This preference will also depend on the oligomer structure itself.

Preferably there are multiple alkoxy groups available on the oligomer so that upon curing these oligomers may cross-link with each other and/or the inorganic filler, if present. Thus, R is —OR², more preferably ethoxy or methoxy, in at least one quarter of the R groups, more preferably in at least half of the R groups, while the remainder of the R groups are B or R³ groups, more preferably, trialkoxysilylethyl groups, most preferably triethoxysilylethyl. Preferably, in such embodiments p=0, o=0, m=2 and n=2 to 20.

To further reduce volatility of lower molecular weight oligomers, and/or to reduce VOC's during curing, alkoxy groups of high chain length, such as octyloxy or dodecyloxy, may be provided as OR² groups. This can be accomplished by transesterifying readily available methoxy or ethyoxy groups to a $C_8$ or higher alkoxy group, for instance, octanol or dodecanol. The transesterified oligomers provide hydrophobicity in the filled elastomer compositions and are permanently bound to the polymer when the compound is crosslinked, usually with peroxides.

If the low volatility siloxane oligomer contains ethylenic unsaturation, as is preferred in some embodiments, it may find suitability for commercial cohydrolysis products of dimethyl and vinylmethylchlorosilanes. For coatings, off-gassing of methanol or ethanol may be reduced or eliminated by use of low-volatility oligomers produces by transesterification as described above.

If coupling to a filler or substrate is required for mechanical property improvement, and/or if the oligomer is used as a crosslinker or adhesion promoter in an RTV silicone formulation, the lower alkoxy moieties are preferred. Oligomers which contain both lower and higher alkoxy groups, e.g. by partially transesterifying lower alkoxy groups, allow for fine tuning of hydrophobicity and filler coupling properties. Thus the synthesis processes employed lead to an unlimited number of structures within the overall scope of the invention.

It is preferred that the oligomer has a viscosity of 0.5 to 500 csks or more preferably 0.5 to 200 csks (25° C.). As is clear to one of skill in the art, the viscosity of the oligomer may be adjusted by adjusting the number of siloxy groups in the oligomer. In most applications the viscosity will be adjusted for a specific application to ensure that the composition containing the oligomer will spread over a specific substrate or be sprayable.

A preferred formula for the oligomer is $$[R(R^2O)_2SiO_{1/2}]_m[O_{1/2}SiR(OR^2)O_{1/2}]_n[SiO_{3/2}R]_o$$

with R, $R^2$, m, n and o as above. Preferably $R^2$ is ethyl, o=0, m=2 and n=0 to 15, more preferably 0–15.

Examples of the inventive oligomers which do not include aliphatic unsaturation include the following structures:

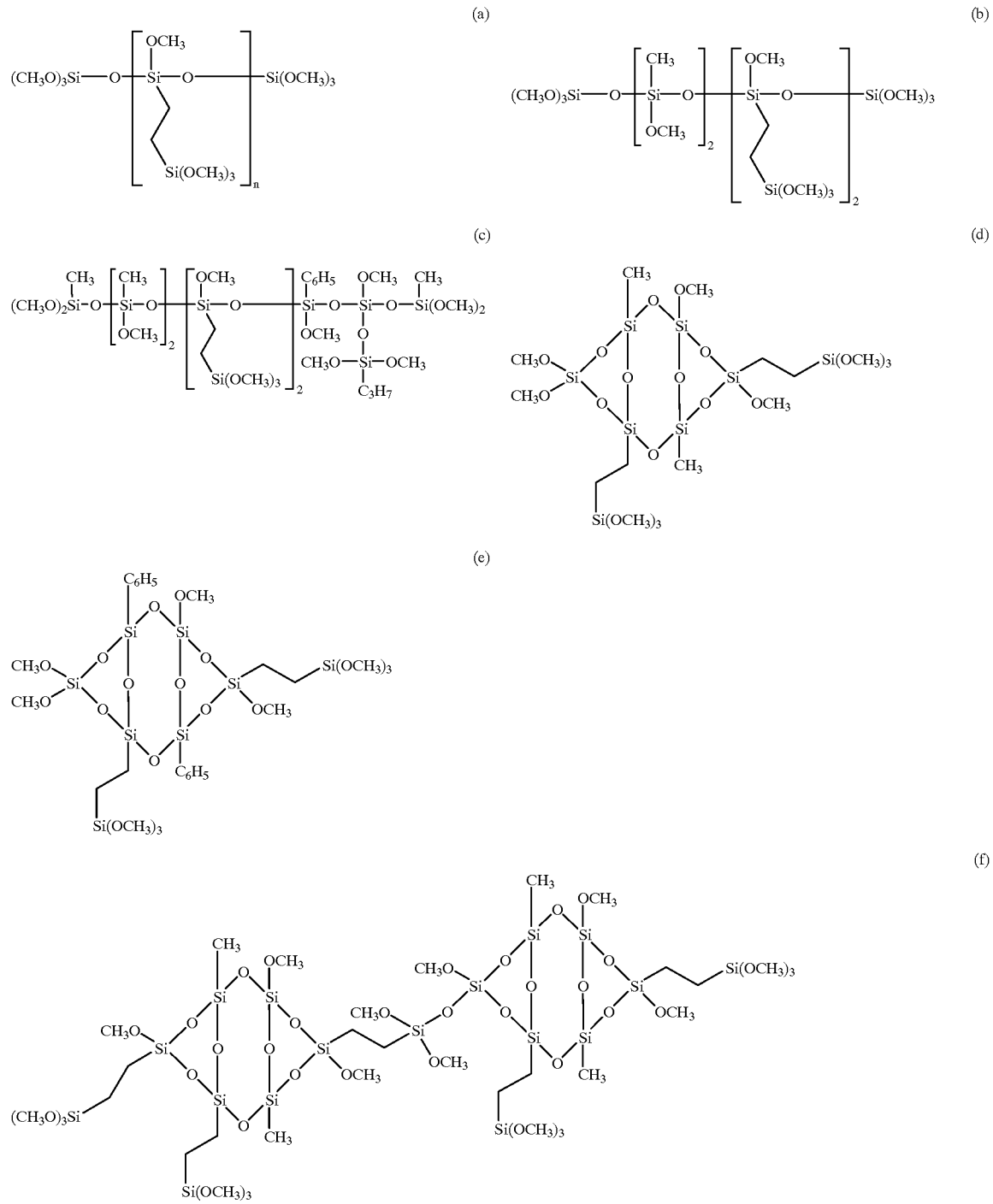

(g)
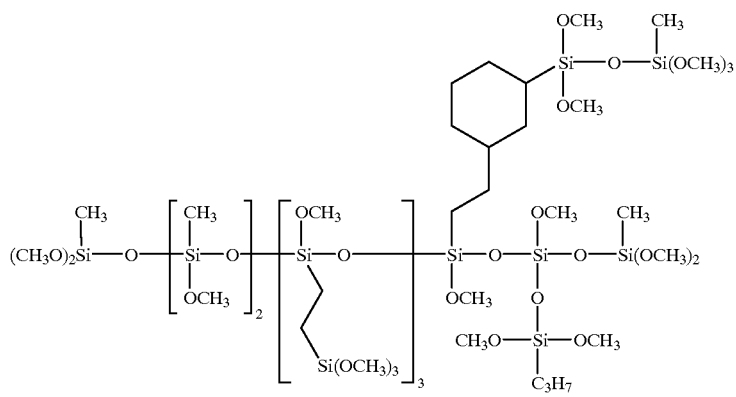
(h)
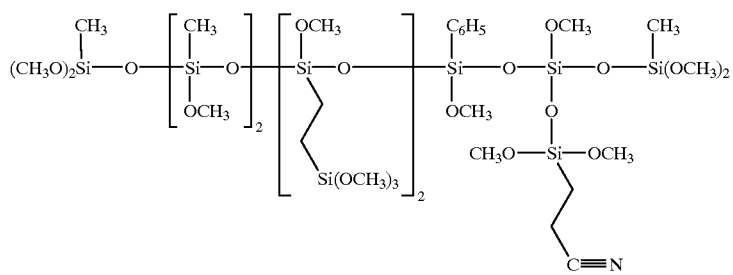
(i)
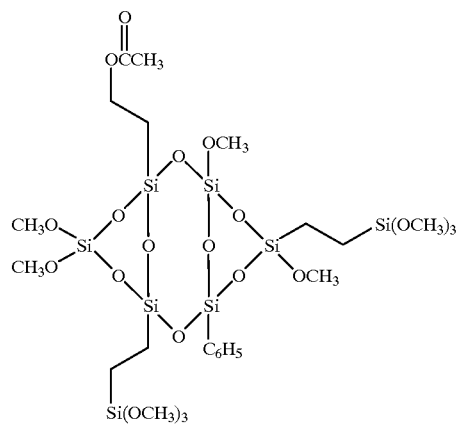
(j)
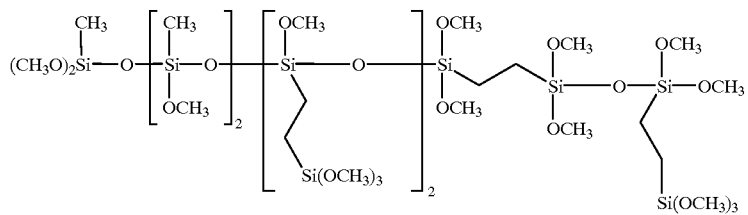

Exemplary oligomers which do include aliphatic unsaturation include the following structures in which a, b and c are respectively positive integers the sum of which is from about 2 to about 20, preferably about 15 or less.

(k) Condensate of vinyltrimethoxysilane, tetramethoxysilane and methacryloxypropyltrimethoxysilane:

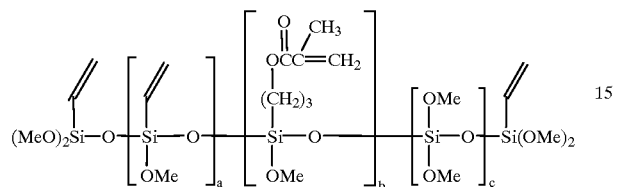

(l) Condensate of vinyltriethoxysilane, tetraethoxysilane and methacryloxypropyltriethoxysilane:

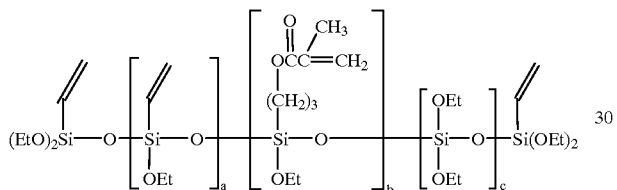

(m) Condensate of vinyltrimethoxysilane and methacryloxypropyltrimethoxysilane:

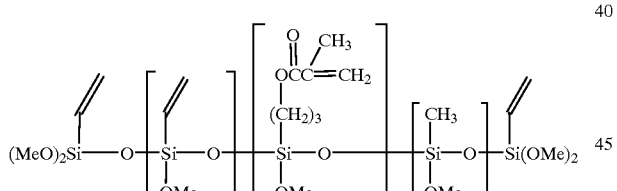

(n) Condensate of methacryloxypropyltrimethoxysilane and phenyltrimethoxysilane:

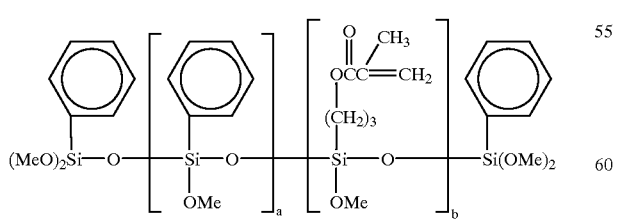

(o) Condensate of vinyltrimethoxysilane, tetramethoxysilane and phenyltrimethoxysilane:

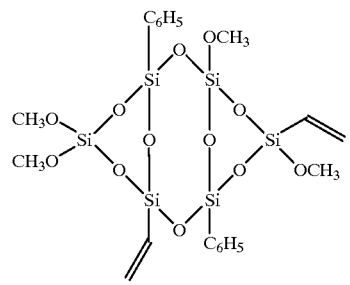

(p) Condensate of vinyltriethoxysilane and acryloxypropyltriethoxysilane:

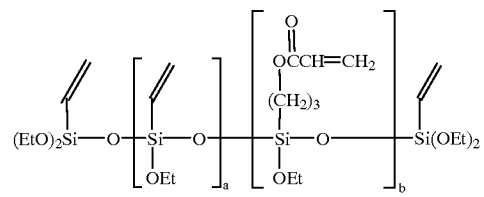

(q) Condensate of vinyltriethoxysilane and cyanopropyltriethoxysilane:

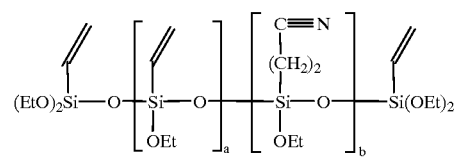

(r) Condensate of methacryloxypropyltriethoxysilane and 2-methoxyethyltriethoxysilane:

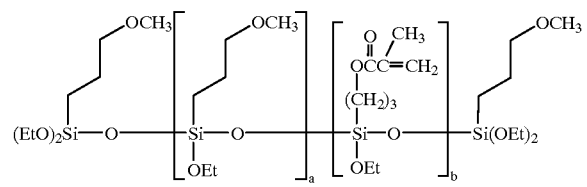

(s) Condensate of vinyltriethoxysilane, octyltriethoxysilane and ethyl-N-(3-triethoxysilylpropyl)carbamate:

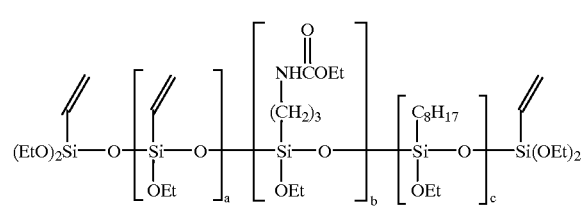

(t) Condensate of vinyltrimethoxysilane and beta-(3,4-epoxycyclohexyl)ethyltrimethoxysilane:

(u) Condensate of vinyltrimethoxysilane and glycidoxypropyltrimethoxysilane:

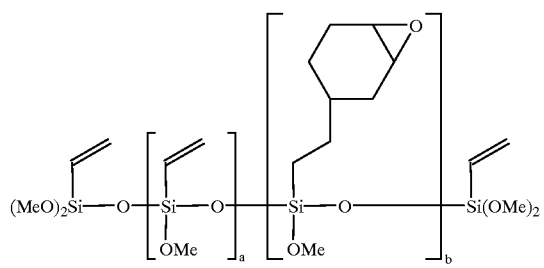

(v) Condensate of vinyltriethoxysilane and gamma-ureidopropyltriethoxysilane:

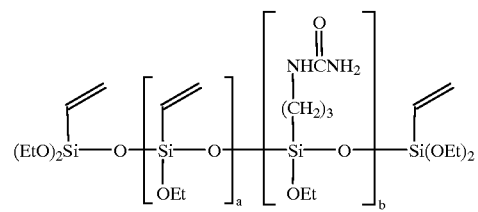

(w) Condensate of methacryloxypropyltriethoxysilane and beta-(3,4-epoxycyclohexyl)ethyltriethoxysilane:

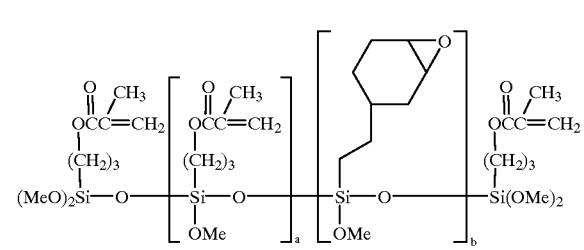

(x) Condensate of vinyltriethoxysilane, tetraethoxysilane and (methoxypolyethoxypropyl)triethoxysilane (n=2–100, preferrably >50, more preferably 2–10):

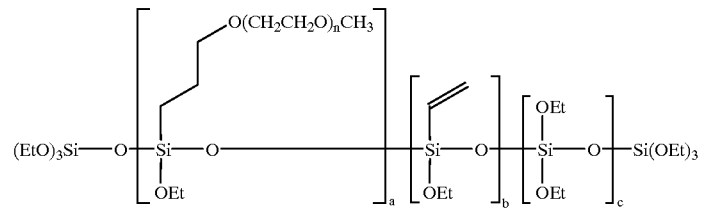

(y) Condensate of vinyltriethoxysilane, methacryloxytriethoxysilane and tetraethoxysilane:

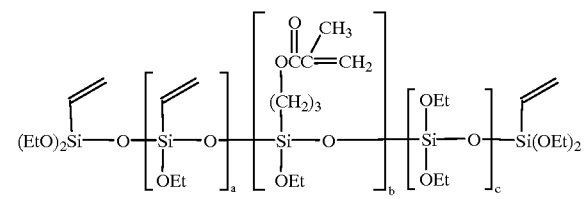

(z) Condensate of vinyltriethoxysilane, methacryloxytriethoxysilane and methyltriethoxysilane:

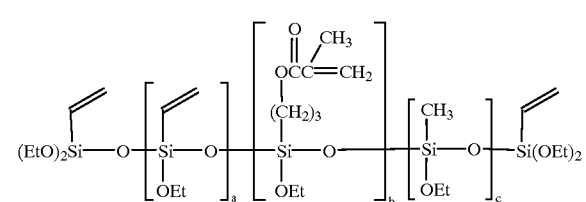

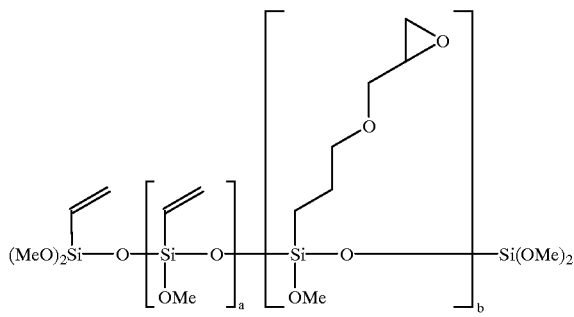

(aa) Condensate of vinyltriethoxysilane, methacryloxytriethoxysilane and octyltriethoxysilane:

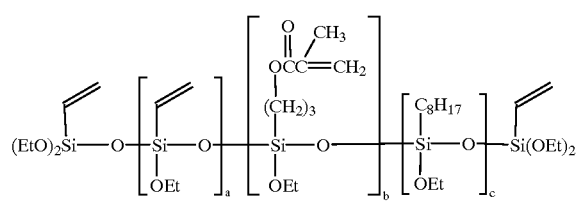

(bb) Condensate of vinyltriethoxysilane, methacryloxytriethoxysilane and phenyltriethoxysilane:

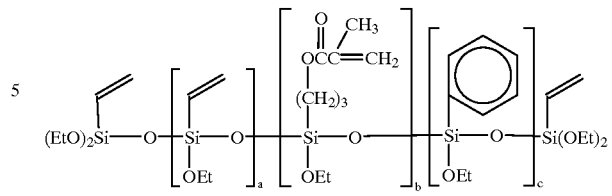

Examples of oligomers which include both aliphatic unsaturation and bridge groups B include the following structures in which a, b and c are respectively positive integers the sum of which is from about 2 to about 20, preferably about 15 or less and u is 1–8, preferably 2 to 4.

(cc)

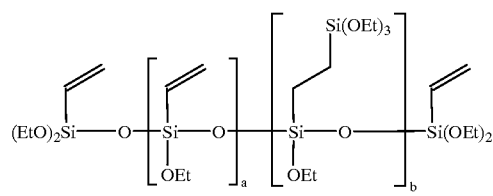

(dd)

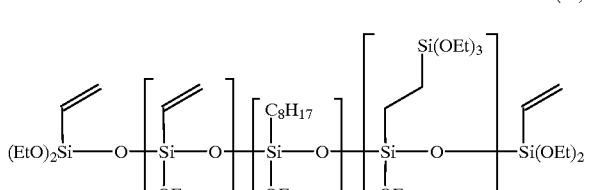

(ee)

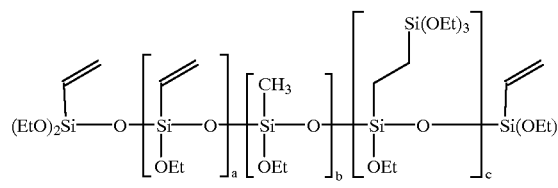

(ff)

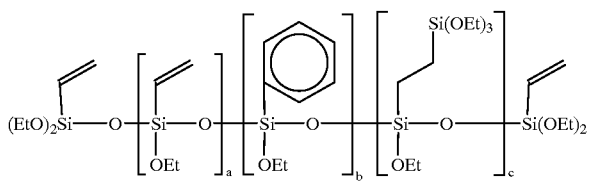

(gg)

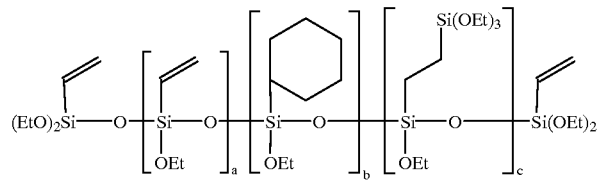

(hh)

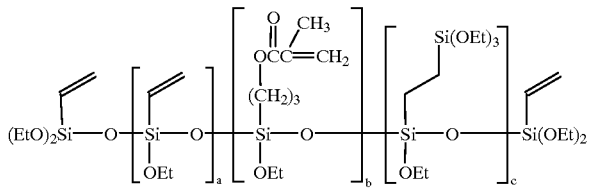

(ii)

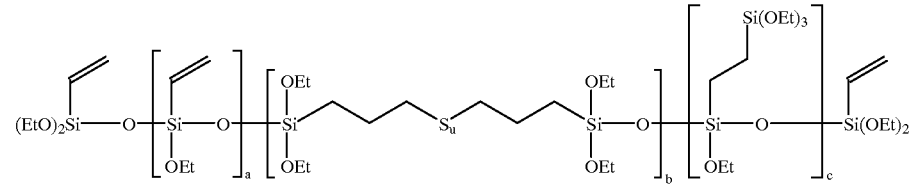

(jj)

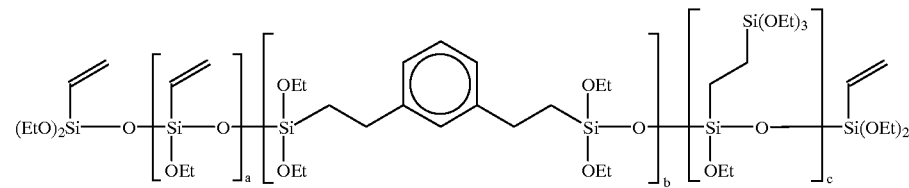

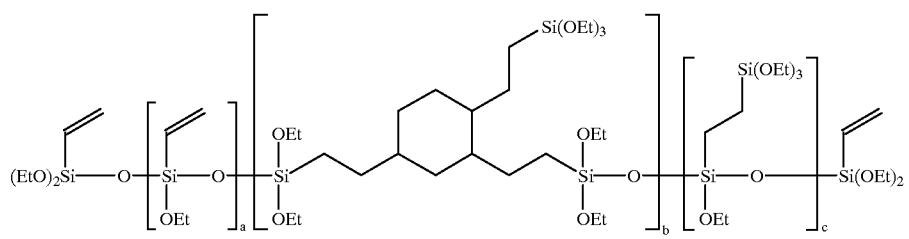
(kk)
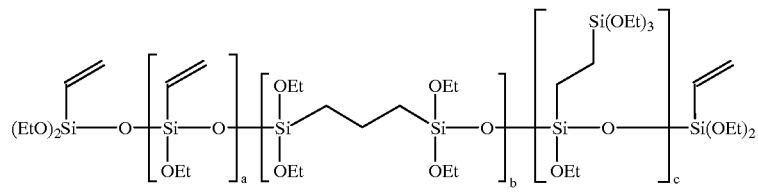
(ll)
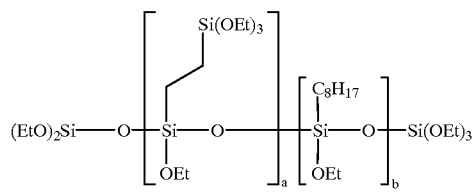
(mm)
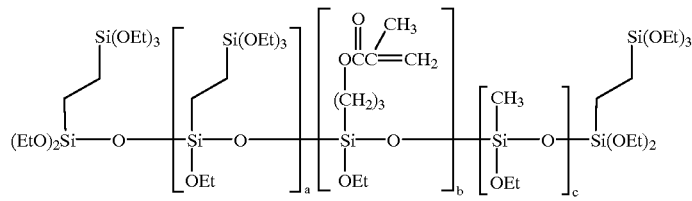
(nn)
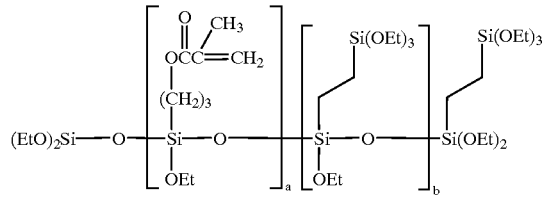
(oo)
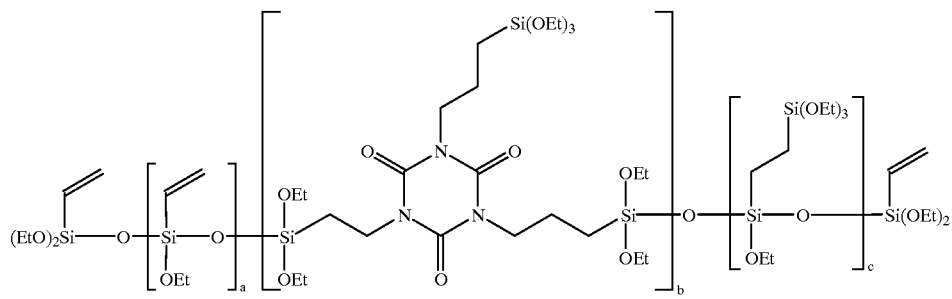
(pp)

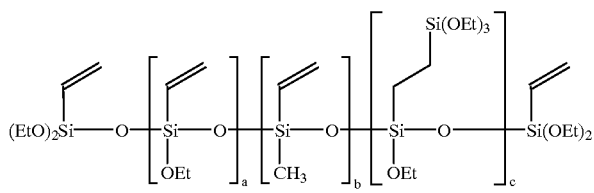

(qq)

The skilled person will understand that the above formulae represent only some of the possible structures which are obtained from the identified condensates. Typically, the structures will be mixtures, with varying terminal groups and with some species being linear, some cyclic or polycyclic, and some branched.

For lower molecular weight oligomers, volatility can be reduced significantly by providing alkoxy groups of high chain length, such as octyloxy or dodecyloxy. This can be accomplished by transesterifying readily available methoxy or ethoxy groups to a $C_8$ or higher alkoxy group, for instance an octyloxy or dodecyloxy group. The transesterified oligomers provide hydrophobicity in the filled elastomer compositions and are permanently bound to the polymer when the compound is crosslinked, usually with peroxides. $C_{12}$ or higher alkoxy groups, e.g. dodecyloxy, have been observed to have only a very slight tendency to hydrolyze, so that such groups may be suitable inexpensive replacements for non-reactive $R^1$ groups in many cases.

The aliphatically unsaturated siloxane oligomers described herein are suitable replacements for commercial cohydrolysis products of dimethyl and vinylmethylchlorosilanes. Using a process to make an oligomer starting with vinyl alkoxy silanes, optionally in combination with alkylalkoxy and/or tetraalkoxy silanes, reduces the cost of the oligomer. Unexpectedly, in wire and cable applications, the mechanical and wet electrical stability properties of the elastomer cable insulation compound made with the new oligomers are improved. For coatings, off-gassing of methanol or ethanol may be reduced or eliminated by use of low-volatility oligomers produced by transesterification as described above.

If coupling to filler is required for mechanical property improvement the lower alkoxy moieties are preferred. They may be attached to the backbone of the oligomer, or pendant if a subsequent hydrosilation process is employed to attach them to the vinyl groups. Oligomers which contain both lower and higher alkoxy groups, e.g. by partial transesterifying lower alkoxy groups, allow for fine tuning of hydrophobicity and filler coupling properties. Thus the synthesis processes employed lend to an unlimited number of structures within the overall scope of the invention.

Oligomer Manufacture

The oligomers may be formed by condensation reactions of hydrolyzable silane compounds. If the oligomer is to include a B group, such group may be provided in the starting silane or, it may be subsequently formed by a hydrosilation reaction. The hydrosilation reaction may use an alkoxyhydridosilane or hydridosiloxane, and an oligomer having an ethylenically unsaturated hydrocarbon group thereon such as a vinyl group.

The condensation may be performed according to any of the procedures disclosed in the previously identified patents, U.S. Pat. No 4,950,779, Wengrovius, et al., U.S. Pat. No 5,282,998, Horn, et al., and U.S. Pat. No 5,210,168, Bergstrom, et al.

To provide an $R^3$ group the condensation reaction will employ a silane reactant which includes an unsaturated aliphatic hydrocarbon group. Representative examples of alkoxysilanes which include unsaturated aliphatic hydrocarbon groups include: vinyltrimethoxysilane, vinylmethyldimethoxysilane, vinyldimethylmethoxysilane, vinyltriethoxysilane, vinyltriisopropenoxysilane, methacryloxypropyltriethoxysilane, methacryloxypropyltrimethoxysilane, acryloxypropyltrimethoxysilane, acryloxypropyltriethoxysilane, acryloxyethyltrimethoxysilane, trimethoxysilylpropyl methyl maleate, styryloxypropyltriethoxysilane, allyltrimethoxysilane, allyloxypropyltriethoxysilane, allyl-N-(3-trimethoxysilylpropyl)carbamate, methacrylamidopropyltriethoxysilane, methacryloxypropyleneoxypropylmethyldimethoxysilane, crotyloxypropyltrimethoxysilane, and the like. Corresponding compounds in which silylalkoxy groups are replaced by silyloxyacetyl groups may also be used.

To produce an oligomer containing a B group in a one-step process, the condensation reaction may incude as a reactant a bis, tris, or higher alkoxysilane. Preferably, a bis-dialkoxysilane or bis-trialkoxysilane is used as the source of the B group in such a process. Examplary silanes are 1,4-bis-(triethoxysilylethyl)cyclohexane; 1,3,5-tris-(triethoxysilylethyl)cyclohexane; bis-(triethoxysilylethyl) benzene; tris-triethoxysilylethyl isocyanurate, and 1,4-bis-(triethoxysilyl)butane.

During condensation, other optional alkoxy or acyloxy silanes may be incorporated into the oligomer including, but not limited to, aryl silanes, alkyl silanes, alkylcarbamato silanes, alkylcyano silanes, polyalkylene oxide silanes, alkylester silanes, alkylamido silanes or isocyanurate silanes. These silanes must have at least one alkoxy group or acyloxy group, but preferably are di- or tri-alkoxy silanes. Specific examples of these silanes include: phenyltrimethoxysilane, phenylmethyldimethoxysilane, napthyltrimethoxysilane, cyanopropyltriethoxysilane, glycidoxypropyltriethoxysilane, beta-(3,4-epoxycyclohexyl)trimethoxysilane, (polyethyleneoxy) propyltrimethoxysilane, (poly(ethyleneoxy)(propyleneoxy)) propyltriethoxysilane, 3-trimethoxysilylpropyl acetate, 3-methyldiethoxysilylpropyl acetate, phenyl N-(3-trimethoxysilylpropyl)carbamate, 3-triethoxysilylpropyl N-phenylcarbamate, methyl N-(3-trimethoxysilylpropyl) carbamate, 3-methyldiethoxysilylpropyl thioacetate, 3-trimethoxysilylpropyl thioacetate, 3-triethoxysilylpropyl thioacetate, 3-trimethoxysilylpropyl thiopropionate, 3-triethoxysilylpropyl thiobenzoate; 3-triethoxysilylethyl thioacetate, 3-triethoxysilylmethyl thioacetate, and 3-triethoxysilylpropyl thiooctanoate. Corresponding compounds in which silylalkoxy groups are replaced by silyloxyacetyl groups may also be used.

Moreover, in the condensation, dialkoxysiloxy units may be inserted into the oligomer to affect the cross-linking, surface active and viscoelastic properties of the oligomer. Said may be done by using tetraalkoxysilanes, such as tetramethoxysilane or tetraethoxysilane.

The condensation of the alkoxy silane monomers is suitably performed in the presence of a carboxylic acid (e.g., acetic or formic acid) or water. Alternatively, a strong condensation catalyst may be used, e.g., a strong acid of an acidic ion exchange resin such as AMBERLYST resin from Rohm & Haas Co. The other reaction conditions of the condensation will depend on the monomeric silanes; however, temperature ordinarily will be in the range of 20 to 60° C. Exemplarily reaction conditions may also be found in U.S. Pat. No. 4,950,779, Wengrovius, et al., U.S. Pat. No 5,282,998, Horn, et al., and U.S. Pat. No 5,210,168, Bergstrom, et al.

To form a B group containing oligomer in a two-step condensation/hydrosilation process, the product of the condensation may be a siloxane oligomer containing a plurality of unsaturated groups attached to silicon atoms on the siloxane oligomer backbone by Si—C bonds. The unsaturated functionalized siloxane oligomer so produced is then reacted with a hydrido silane in the presence of a known hydrosilation catalyst, for instance a platinum, palladium or rhodium based catalyst. Such hydrosilation, for example, may be accomplished according to U.S. Pat. No. 5,527,936, which is incorporated herein by reference. It is preferred that the hydrido silane be a silane having multiple hydrolysable groups, such as a trialkoxysilane, to afford multiple cross-linkable sites on the resulting oligomer. During reaction, hydridosilane is reacted with unsaturated group(s) on the oligomer such that a bond is formed between the silicon atom and the unsaturated group (which, if ethylenic, is saturated in the process). To produce an oligomer having both a bridge group B and an aliphatically unsaturated hydrocarbon group, a deficiency of the hydridosilane may be used, relative to the number of unsaturated groups available on the oligomer so that at least about one unsaturated group per oligomer molecule remains after the hydrosilation. The unsaturated groups remaining on the oligomer after the hydrosilation allow the oligomer to become crosslinked with the organic polymer matrix during the subsequent cure reaction of the organic polymer/filler/coupling agent composition of the invention.

The skilled person will recognize that in some cases oligomers with B groups may be prepared by first forming a hydridosilyl functional oligomer using a hydrido silane such as triethoxysilane, optionally together with other silanes as described above, and then hydrosilating an aliphatically unsaturated silane, for instance triethoxyvinylsilane or triethoxymethylvinylsilane.

The oligomers of the invention are useful as crosslinkers, coupling agents, adhesion promoters, as intermediates for the prepartion of other oligomers and as filler treating agents. Illustrative compositions into which the oligomers may be incorporated include curable polymer/filler compositions used for wire and cable insulation and the like; silicate hard coats; adhesion promoting primers for paints or adhesives; masonry sealants; UV or EB cured acrylic coatings; (meth)acrylate ester based adhesives and sealants, such as anaerobic adhesives and polymer-in-monomer syrup adhesives; polyester resin systems used to form reinforced composites with fiberglass, carbon or kevlar reinforcements; and RTV silicones.

The oligomers may also be converted to hydrolyzates, in which the $OR^2$ groups are replaced by OH, and used in that form in aqueous dispersions, as adhesion promoting or sealing primers, as additives to polymer emulsions, as filler treating agents and in curable silicone formulations.

Curable Polymer/Filler Compositions

The curable polymer/filler compositions of the present invention comprise: (1) a free-radically curable organic polymer, (2) an inorganic filler and (3) an oligomer having at least one $R^3$ group as described above. The composition may also include a free-radical catalyst or generator. Typical organic polymers to which the present invention applies are curable elastomers such as any of the synthetic or natural rubbers with which fillers are conventionally employed. Examples include natural rubber, synthetic rubbers such as styrene-butadiene rubber, ethylene-propylene copolymers, polyethylene, ethylene-vinyl acetate copolymers, ethylene-propylene terpolymer rubbers in which the third monomeric component is ethylidene norbornene or 1,4-hexadiene, urethane rubbers, polyisobutadiene rubbers, and any other vulcanizable or crosslinkable elastomeric material.

The inorganic fillers used in the curable compositions are known to those skilled in the art and include any suitable finely divided or particulate inorganic substance. At the time of incorporation into the curable composition most fillers may be in the form of finely divided particles. They may be approximately isometric, having a maximum diameter, i.e., a maximum linear dimension of ten $\mu$m, preferably five $\mu$m; or they may be in the form of plates or needles (fibers) having a thickness or diameter of twenty $\mu$m or less, preferably five $\mu$m or less. Compositions containing larger particles may be usefully formulated but they tend give poor properties. The minimum size of the filler particles is not critical, any of the conventionally used fillers being suitable in this respect. Among the specific fillers which may be used in the present invention are asbestos, ground glass, kaolin and other clay minerals, silica, calcium silicate, calcium carbonate (whiting), magnesium oxide, barium carbonate, barium sulfate (barytes), metal fibers and powders, glass fibers, refractory fibers, titanium dioxide, mica, talc, chopped glass, alumina, aluminatrihydrate, quartz, wollastonite (calcium silicate), and inorganic coloring pigments. Kaolin clay is a filler of choice in the wire and cable industry and therefore is preferred.

A heat activated free-radical catalyst or generator will typically be incorporated into the curable compositions of the invention. However, in some cases such a catalyst may not be required, for instance when the oligomer contains disulfide or polysulfide groups in the bridging structure A of group B, or when other sources of free radicals are used such as UV radiation. When a free-radical catalyst is employed it may be any known catalyst or vulcanizing agent compound, of which organic peroxides, azonitrile compounds (e.g. AIBN) and sulfur are examples. Metal drier compounds, such as fatty acid, octoate or naphthoate salts of zinc, calcium, cobalt, copper, molybdium, manganese, chromium or nickel, may also be used as cure catalysts. Preferred catalysts are organic peroxides. Any of the peroxides described or listed in Martens' U.S. Pat. No. 3,148,169 can be employed. The catalyst is one which is heat activated so that when a mixture of the organic elastomer and catalyst is heated to a given temperature or temperature range the crosslinking reaction takes place.

Any other additives conventionally employed in free-radically curable polymer/filler to the curable composition can be used. For example, stabilizers and antioxidants, cure boosters, cure activators, cure accelerators, crosslinkers, waxes, oils, wet electrical stabilizers, and plasticizers can be added. Additional pigmentation can be provided and any other additive for providing or modifying other properties can be used. Other silane crosslinkers, such as vinyltrimethoxysilane or (meth)acryloxytrimethoxysilane, may also be included in the composition, or such silanes may incorporated into the organic polymer backbone by copolymerization.

The proportions of components in the curable composition are not narrowly critical and conventionally are based on weight parts per 100 wt. parts of organic elastomer. On this basis the inorganic filler can be varied from 25 to 200, preferably 50 to 150, wt. parts per 100 wt. parts of elastomer. The coupling composition can be present in an amount ranging from 0.1 to 10, preferably from 0.5 to 3 weight parts per 100 wt. parts of filler and the peroxide or other radical catalyst can be used in amounts of 0.5 to 10 wt. parts, preferably 2 to 5 wt. parts per 100 wt. parts of elastomer.

The curable compositions, except for the catalyst component are conventionally prepared in a BANBURY mixer (Farrel Co.) or any other intensive mixer. Accepted rubber industry compounding techniques may be used. The catalyst, if employed, may be added in the BANBURY mixer or by transferring the resulting compound to a roll mill wherein it is rolled and the peroxide is added and mixed into the compound. Either way, the result is a curable composition which then can be used to coat electrical conductors for the purpose of insulating same after curing. These compositions can also be used for a variety of other applications where low water pickup is desirable, for instance encapsulating of electrical components and other electrical insulation applications, gaskets, seals, pump diaphragms, automotive ignition wires, sulfur cured rubbers, etc. Wire and cable insulations are preferred uses for the filled compositions of the invention.

In order to cure the curable compositions it is only necessary to apply heat above the temperature at which the catalyst becomes activated. Preferably a peroxide is chosen for use having a decomposition temperature in excess of 200° F. (93° C.), preferably in excess of 250° F. (121° C.). In producing insulated wire cable the curable composition, in heated readily deformable condition (but below the decomposition temperature of the catalyst), is applied through an extruder to a conductor to form an insulating coating around the conductor. After extrusion onto the conductor the combined conductor and coating of curable composition is passed into an oven or autoclave where the temperature is raised to a point above the decomposition temperature of the peroxide upon which the curable composition crosslinks to form a tough cured thermoset insulating coating around the conductor.

Other Curable Compositions

These oligomers of formula (I) above, are also useful in coatings or adhesive formulations, as crosslinkers, adhesion promoters, to provide a dual radical/moisture cure mechanism, and/or to provide moisture resistance in the cured coating. The oligomers may be used as reactive diluents, in that they have little volatility, provide little or no contribution to volatile organic compounds (VOCs) and have an adjustable viscosity to match an application, or to dilute another composition to make the entire composition spreadable or sprayable. For such applications oligomers in which $R^3$ comprises an acrylate or methacrylate group are preferred.

The oligomers may be used in masonry waterproofing, paints, corrosion protection systems, and on substrates such as cement, metal, polymers (PVC, PVS, EPDM, PE, PP, ABS, EPR, BR, silicone, polycarbonate, etc.), wood, a paint layer (as a primer) or rubber. Moreover, oligomers may be used in silicate hardcoats.

The oligomers may be used by themselves or with other monomers. The oligomers may be copolymerized with unsaturated monomers. Specifically the oligomers are useful in the automotive clearcoats which may be made per U.S. Pat. No. 5,244,696 to Hazan et al., incorporated herein by reference. Clearcoats made with the present oligomer have good mar resistance, good gloss (and gloss retention), chemical resistance, distinctiveness of image (DOI), and stain resistance. For such applications the oligomers preferably contain no $R^3$ groups, and if $R^3$ groups are present, they preferably are acryl or methacryl containing groups.

Coating compositions incorporating the oligomers of this invention can include a number of ingredients to enhance preparation of the composition as well as to improve final properties of the coating composition and the finish. For example, it is often desirable to include about 20 to 90%, preferably 20 to 60%, by weight of the composition, of a film-forming reactive silane polymer. Such polymer typically has number average molecular weight of about 500 to 10,000.

The silane polymer is the polymerization product of about 30–95%, preferably 40–60%, by weight of ethylenically unsaturated nonsilane-containing monomers and about 5–70%, preferably 10–60%, by weight of ethylenically unsaturated silane-containing monomers, based on the weight of the organosilane polymer. Suitable ethylenically unsaturated nonsilane-containing monomers are alkyl acrylates, alkyl methacrylates and mixtures thereof, where the alkyl groups have 1–12 carbon atoms, preferably 3–8 carbon atoms.

The film-forming component of the coating composition is referred to as the binder and is dissolved, emulsified or otherwise dispersed in an organic solvent or liquid carrier. The binder generally includes all the components that contribute to the solid organic portion of the cured composition. Generally, pigments, and chemical additives such as stabilizers are not considered part of the binder. Non-binder solids other than pigments typically do not exceed about 5% by weight of the composition. The term binder includes the oligomer of the present invention, the organosilane polymer, the dispersed polymer, and all other optional film-forming components. The coating composition may contain about 50–100% by weight of the binder and about 0–50% by weight of the organic solvent carrier.

Suitable alkyl methacrylate monomers used to form the silane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like.

Cycloaliphatic methacrylates and acrylates also can be used, such as trimethylcyclohexyl methacrylate, trimethylcyclohexyl acrylate, iso-butyl cyclohexyl methacrylate, t-butyl cyclohexyl acrylate, and t-butyl cyclohexyl methacrylate. Aryl acrylate and aryl methacrylate also can be used, such as benzyl acrylate and benzyl methacrylate. Mixtures of two or more of the above-mentioned monomers are also suitable.

In addition to alkyl acrylates and methacrylates, other polymerizable nonsilane-containing monomers, up to about 50% by weight of the polymer, can be used in the silane modified acrylic polymer for the purpose of achieving the desired properties such as hardness; appearance; mar, etch and scratch resistance, and the like. Exemplary of such other monomers are styrene, methyl styrene, acrylamide, acrylonitrile, methacrylonitrile, hydroxyethyl acrylate, methacrylic acid and the like.

The oligomers may also be employed in curable compositions comprising ethylenically unsaturated monomers or prepolymers and a free-radical catalyst. Such compositions include UV or EB curable adhesives and coatings, resins and gel-coats formulated from unsaturated polyesters, anaerobically cureable adhesives, acrylic engineering adhesives based on polymer-in-monomer syrups, and the like. For such applications the oligomer preferably comprises a free-radically curable group, for instance one or more $R^3$ groups, or vulcanizable group, such as a blocked mercaptan or polysulfide. More preferably the oligomer comprises at least one vinyl, acryl or methacryl group. The oligomer may be employed at levels of from about 0.5 to about 99% of such compositions, preferably about 1 to about 50%, depending on the properties desired to be obtained or modified in the cured formulations.

The adhesive and coating compositions of the invention also will typically include a free-radical catalyst, although this is not always necessary, for instance in formulations designed for EB curing or where the oligomer contains a polysulfide group in the bridge group B or in an $R^4$ group. The free radical catalyst may be any of the heat activatable catalysts described above or a free radical photoinitiator. Examples of free-radical photoinitiators include benzophenone, acetophenone, chlorinated acetophenone, dialkoxyacetophenones, dialkylhydroxyacetophenones, dialkylhydroxyacetophenone esters, benzoin, benzoin acetate, benzoin alkyl ethers, dimethoxybenzoin, dibenzylketone, benzoylcyclohexanol and other aromatic ketones, acyloxime esters, acylphosphine oxides, acylphosphonates, ketosulfides, dibenzoyldisulphides, diphenyldithiocarbonate and diphenyl(2,4,6-trimethylbenzoyl)phosphine oxide. Typically the photoinitiator will be employed in an amount of 0.1 to 10%, preferably 0.5 to 5% by weight of the composition.

The adhesive or coating compositions of the invention may also include any other component conventional for the type of formulation into which the oligomer is incorporated.

The invention is illustrated by the following non-limiting examples, wherein parts and percentages are on a weight basis unless otherwise stated.

EXAMPLES

Example 1

Preparing a Silane-containing Acrylic Polymer

A silane-containing acrylic polymer is prepared similar to those listed in U.S. Pat. No. 4,499,150. A flask equipped with condenser, stirrer, and thermometer was charged with 218.4 g butyl acetate, 93.6 g VM &P naphtha and 62.4 g toluene and then heated to reflux. Three charges were simultaneously added over a two hour period, under a nitrogen blanket:

Charge I: 582.4 g methyl methacrylate, 291.2 g butyl acrylate, 364.0 g styrene and 218.4 g. gamma-methacryloxypropyltrimethoxysilane.

Charge II: 125 g butyl acetate, and 72.8 g di-t-butyl peroxide.

Charge III: 124.8 g butyl acetate and 72.8 g gamma-mercaptopropyltrimethoxysilane.

Upon the completion of these charges, additional peroxide (5.85 g) was added and the mixture was allowed to reflux for 1.5 hours to assure the completeness of the polymerization. The final resin has a solid content of 69 percent, a Gardner-Holt viscosity of Z+.

Examples for Preparing Oligomers with B Groups

Example 2

To 444.6 g (3.0 moles) of vinyltrimethoxysilane in a 1 l. three-necked flask was quickly added 115.1 g (2.5 moles) 99% formic acid at room temperature. The flask was protected with nitrogen and over 3 hours a combination of methyl formate and methanol (a total of 241.7 g) were distilled from the reaction mixture, producing 310.9 g of partially hydrolyzed and condensed vinylmethoxysiliconate of 0.5 cstks viscosity.

The above reaction mixture was heated to 100° C. and 0.29 g of platinum-divinyltetramethyldisiloxane complex, containing 1.9% Pt, (Karstedt's catalyst; see U.S. Pat. No. 3,775,452) was added. From an addition funnel, 366.0 g (3.0 moles) of trimethoxysilane was added, maintaining the addition rate to sustain a reaction temperature of 110–120° C. After the addition was complete (4 hours), the flask was heated to 150° C., whereupon a small amount of black precipitate (platinum metal) formed. The product was cooled and filtered to produce a clear, colorless liquid of 32 cstks. viscosity.

Example 3

In a procedure similar to Example 2, 444.6 g of vinyltrimethoxysilane was allowed to react with 115.1 g 99% formic acid. During the distillation of volatile components, the flask was heated to 150° C. to distill unreacted vinyltrimethoxysilane. The flask was cooled to 85° C. and 0.29 g of Karstedt's catalyst was added and 366.0 g distilled trimethoxysilane was slowly added, maintaining the temperature of the exothermic reaction between 85–100° C. by the rate of addition of trimethoxysilane. After the reaction was complete, the flask was heated to 150° C., precipitating a small amount of Pt on the walls of the flask. The excess trimethoxysilane was distilled from the reaction mixture. Upon cooling and filtering, 390 g of clear colorless product of 41 cstks. viscosity was isolated. Analysis by $^{13}C$ NMR indicated 78% hydrosilation of the original vinyl groups present.

Example 4

Following Example 2, 48.9 g (0.33 mole) of vinyltrimethoxysilane and 29.8 g (0.17 mole) of 2-cyanoethyltrimethoxysilane were treated with 19.4 g (0.42 mole) of 99% formic acid. The flask contents were heated to 85° C. for 2 hours and the low boiling components were vacuum distilled. Hydrosilylation of the co-oligomeric reaction product with 40.3 g (0.33 mole) of trimethoxysilane and 0.04 g Karstedt's catalyst at 110–120° C., distilling the excess trimethoxysilane to 150° C. The residual catalyst was filtered, yielding a light yellow composition of 14 cstks. viscosity. Analysis by $^{13}C$ NMR indicated 75% hydrosilation of the original vinyl groups present.

Example 5

Following Example 2, 37.1 g (0.25 mole) of vinyltrimethoxysilane and 52.1 g (0.25 mole) of 2-acetoxyethyltrimethoxysilane were treated with a total of 22.1 g (0.48 mole) of 99% formic acid. In this example, the 2-acetoxyethyltrimethoxysilane was allowed to react with 9.7 g (0.21 mole) of formic acid before the addition of the vinyl silane. After distillation of the low boiling components, hydrosilylation of the co-oligomeric reaction product with 30.5 g (0.25 mole) of trimethoxysilane and 0.03 g Karstedt's catalyst at 110–120° C., distilling the excess trimethoxysilane to 150° C. The residual catalyst was filtered, yielding a colorless composition of 50 cstks. viscosity. Analysis by $^{13}C$ NMR indicated >90% hydrosilation of the original vinyl groups present.

Example 6

Following Example 2, 24.5 g (0.165 mole) of vinyltrimethoxysilane and 16.9 g (0.085 mole) of phenyltrimethoxysilane were treated with a total of 11.1 g (0.24 mole) of 99% formic acid. After distillation of the low boiling components, hydrosilylation of the co-oligomeric reaction product with 20.1 g (0.165 mole) of trimethoxysilane and 0.01 g Karstedt's catalyst at 110–120° C., distilling the excess trimethoxysilane to 150° C. The residual catalyst was filtered, yielding a colorless composition of 100 cstks. viscosity. Analysis by $^{13}$C NMR indicated >80% hydrosilation of the original vinyl groups present.

Example 7

Following Example 2, 18.5 g (0.125 mole) of vinyltrimethoxysilane and 29.1 g (0.125 mole) of 7-octenyltrimethoxysilane were treated with a total of 11.0 g (0.24 mole) of 99% formic acid. In this example, the 7-octenyltrimethoxysilane was allowed to react with 4.8 g of formic acid for 1 hour at 84–89° C. before the addition of the vinyl silane. The remaining 6.2 g of formic acid were added and the flask heated for 8 hours at 90–110° C. After distillation of the low boiling components, complete hydrosilylation of both of the olefinic moieties of the co-oligomeric reaction product was attempted with 30.5 g (0.25 mole) of trimethoxysilane and 0.074 g Karstedt's catalyst at 100–120° C., distilling the excess trimethoxysilane to 150° C. The residual catalyst was filtered, yielding a yellow material of 85 cstks. viscosity.

Example 8

Following Example 2, 48.9 g (0.33 mole) of vinyltrimethoxysilane and 38.5 g (0.17 mole) of 2-phenethyltrimethoxysilane were treated with a total of 22.1 g (0.48 mole) of 99% formic acid. After distillation of the low boiling components, hydrosilylation of the co-oligomeric reaction product with 40.3 g (0.33 mole) of trimethoxysilane and 0.05 g Karstedt's catalyst at 120–130° C., distilling the excess trimethoxysilane to 150° C. The residual catalyst was filtered, yielding a straw colored composition of 50 cstks. viscosity.

Example 9

Following Example 2, 24.5 g (0.165 mole) of vinyltrimethoxysilane, 32.7 g (0.165 mole) of 2-phenyltrimethoxysilane, and 25.1 g (0.165 mole) of tetramethoxysilane were treated with a total of 19.3 g (0.42 mole) of 99% formic acid for 4 hours at 87–100° C. After distillation of the low boiling components, hydrosilylation of the co-oligomeric reaction product with 20.3 g (0.165 mole) of trimethoxysilane and 0.05 g Karstedt's catalyst at 102–145° C., distilling the excess trimethoxysilane to 150° C. The residual catalyst was filtered, yielding a clear, colorless product of 14 cstks. viscosity.

Example 10

To a solution containing 59.3 g (0.4 mole) vinyltrimethoxysilane, 54.8 g (0.4 mole) of methyltrimethoxysilane, and 60.9 g (0.4 mole) of tetramethoxysilane in a round bottomed flask was added 66 g (1.15 moles) of glacial acetic acid and 0.9 g (0.5 wt %) of PUROLITE C-175 acidic dry ion exchange resin (manufactured by Purolite Company, division of Bro Tech Corp.). The flask contents were heated to 90° C. for several hours, followed by distillation of 122 g methanol and methyl acetate. The vinyl containing oligomer in the flask then was hydrosilylated with 49 g (0.4 mole) of trimethoxysilane and 0.04 g Karstedt's catalyst at 115–145° C. The final product, after removal of the low boiling components and filtration to remove any solid materials, was 145 g and was 65 cstks. viscosity.

Example 11

In a reaction similar to example 10, solution containing 59.3 g (0.4 mole) vinyltrimethoxysilane, 54.8 g (0.4 mole) of methyltrimethoxysilane, and 60.9 g (0.4 mole) of tetramethoxysilane in a round bottomed flask was added 52.9 g (1.15 moles) of 99% formic acid and 0.9 g (0.5 wt %) of PUROLITE C-175 acidic dry ion exchange resin. The flask was heated to 85–100° C. to distill the produced methanol and methyl formate collecting a total of 99.1 g. The reaction mixture was then filtered, removing the ion exchange resin. The 110.8 g vinyl containing oligomer was then hydrosilylated with 49 g (0.4 mole) of trimethoxysilane and 0.04 g Karstedt's catalyst at 118–144° C. The final product, after removal of the low boiling components and filtration to remove any solid materials, was 153.6 g and was 27 cstks. viscosity.

Example 12

In a reaction similar to example 10, solution containing 59.3 g (0.4 mole) vinyltrimethoxysilane, 54.8 g (0.4 mole) of methyltrimethoxysilane, and 60.9 g (0.4 mole) of tetramethoxysilane in a round bottomed flask was added 20.7 g (1.15 moles) of distilled water and 0.9 g (0.5 wt %) of PUROLITE C-175 acidic ion exchange resin. The reaction mixture was stirred at ambient temperature for one hourthen vacuum distilled, removing 71 g of low boiling components (mostly methanol). The reaction mixture was filtered, leaving 116 g of vinyl oligomer. This component then was hydrosilylated with 49 g (0.4 mole) of trimethoxysilane and 0.04 g Karstedt's catalyst at 110–146° C. The final product, after removal of the low boiling components and filtration to remove any solid materials, was 161 g and was 14 cstks viscosity.

Examples for Viscosity Reducing Properties

Example 13

The silane oligomers (20 g) of the examples above were blended with 100 g of the silane-containing acrylic polymer (Ex. 1). The Gardner-Holt viscosity and the solid contents of the resultant mixtures were measured and the results are shown:

| Sample | Viscosity | % Solid Silane | Visc. 1 w. Resin | % Solid mixture |
|---|---|---|---|---|
| Resin | Z+ | 69% | Z+ | 69% |
| Exp. 3 | 41 cstks | 92% | X—Y | 73% |
| Exp. 4 | 14 cstks | 85% | X+ | 71% |
| Exp. 5 | 50 cstks | 92% | Y—Z | 73% |
| Exp. 6 | 100 cstks | 93% | Y—Z | 73% |
| Exp. 7 | 85 cstks | 94% | Z- | 73% |
| Exp. 8 | 50 cstks | 87% | Y—Z | 72% |
| Exp. 9 | 14 cstks | 76% | X+ | 70% |

The viscosity reducing properties of these compounds were evaluated in another way. The viscosities of these mixtures were measured using Ford Cup, #4. Since the resin (Ex. 1) was very viscous, the resin was diluted with a solvent mixture containing 75% toluene and 25% xylene. So to 85 g of the resin was added 15 g of the solvent mixture. The resultant resin mixture was found to have a solid content of 59% and the Ford Cup #4 viscosity of 147 seconds. To the above resin mixture was added 18.4 g of the silane oligomers or copolymers, the viscosities and the percent solid contents were measured:

| Sample | Viscosity | % NVC silane | Ford Cup #4 sec. | % NVC mixture |
|---|---|---|---|---|
| Resin | — | 59% | 147 | 59% |
| Example 3 | 41 cstks | 92% | 107 | 64% |
| Example 4 | 14 cstks | 85% | 94 | 63% |
| Example 5 | 50 cstks | 92% | 116 | 66% |
| Example 6 | 100 cstks | 93% | — | — |
| Example 7 | 85 cstks | 94% | 126 | 65% |
| Example 8 | 50 cstks | 87% | 109 | 64% |
| Example 9 | 14 cstks | 89% | 104 | 62% |

Examples for Improved Physical Properties

The silane oligomers were formulated with the silane-containing acrylic polymer (Ex. 1) according to Table A and the resultant mixture was coated on the E-coated panel and cured at 130° C. for 30 minutes. The properties of these coatings were listed in Table B.

TABLE A

| Coating Composition | Percent by Weight | Percent by Wt. |
|---|---|---|
| silane-containing acrylic polymer[1] | 83.1% | 92.8% |
| Silane Oligomers | 9.9% | — |
| Dibutyltin dilaurate[2] | 1.0% | 0.9% |
| Blocked acid[3] | 1.5% | 1.9% |
| UV absorber[4] | 0.9% | 1.0% |
| Polysiloxane[5] | 1.7% | 2.0% |
| Triethylorthoformate | 1.9% | 1.5% |

[1]To 100 grams of the acrylic silane polymer was added a solvent mixture consists of 8.6% butyl acetate, 11.9% acetone, 16.8% toluene, 56.4% xylene, 4% Cellosolve acetate (ethylene glycol monoethyl ether acetate), 2.3% butyl carbitol acetate (diethylene glycol monobutyl ether acetate).
[2]10 wt. % solution in xylene.
[3]NACURE 5925 amine blocked dodecyl benzene sulfonic acid from King Industries.
[4]TINUVIN 328 U.V. light absorber, product of Ciba-Geigy, Inc.
[5]DC 200 from Dow Corning Corp., dissolved in xylene to give a 0.54 wt. % solution.

TABLE B

| Sample | Gloss 20°[1] | Gloss 60°[1] | DOI[2] | Pencil Hardness[3] |
|---|---|---|---|---|
| Resin | 88 | 94 | 100 | 2B |
| Example 3 | 84 | 92 | 100 | 2B |
| Example 4 | 84 | 93 | 100 | 2B |
| Example 5 | 84 | 91 | 100 | 2B |
| Example 6 | 86 | 93 | 100 | 2B |
| Example 7 | 81 | 91 | 100 | 2B |
| Example 8 | 86 | 93 | 100 | 3B |
| Example 9 | 86 | 92 | 100 | 2B |

[1]ASTM D-523
[2]Distinctness of Image
[3]ASTM D-3363-74

Examples of Oligomers with B Groups and Aliphatically Unsaturated Hydrocarbon Groups Example 14

To 142.7 g (0.75 mole) of vinyltriethoxysilane and 52.1 g (0.25 mole) of tetraethoxysilane in a 500 ml. three-necked flask was quickly added 41.4 g (0.9 mole) 96% formic acid at room temperature. The flask was protected with nitrogen and over 3 hours with heating, a combination of ethyl formate, ethanol and unreacted vinyltriethoxysilane (a total of 102.9 g) were distilled from the reaction mixture, producing 128.1 g of vinyl-containing ethoxysiliconate oligomer of 0.5 cstks viscosity.

The above reaction mixture was heated to 120° C. and 0.11 g of platinum-divinyltetramethyldisiloxane complex, containing 1.9% Pt, (Karstedt's catalyst; see U.S. Pat. No. 3,775,452) was added. From an addition funnel, 12.3 g (0.074 mole) of triethoxysilane was added over 30 min., maintaining the addition rate to sustain a reaction temperature of 120–125° C. After the addition was complete, the flask was maintained at 125–130° C., whereupon a small amount of black precipitate (platinum metal) formed. The product was cooled and filtered to produce 139.5 g of a clear, almost colorless liquid of 1–2 cstks. viscosity.

Example 15

In a manner similar to Example 14, a mixture of 142.7 g (0.75 mole) of vinyltriethoxysilane and 44.6 g (0.25 mole) of methyltriethoxysilane were allowed to react with 41.4 g (0.9 mole) 96% formic acid, and with heating, 120.9 g of ethanol, ethyl formate and unreacted methyltriethoxysilane and vinyltriethoxysilane were distilled from the reaction mixture. The resulting 120.9 g of vinyl siliconate oligomer was hydrosilylated with 12.3 g (0.074 mole) of triethoxysilane in the presence of 0.11 g Karstedt's catalyst (as above). The final product, 131.3 g, was clear and colorless after filtration, and 1–2 cstks. viscosity.

Example 16

In a manner similar to Example 14, a mixture of 171.3 g (0.9 mole) of vinyltriethoxysilane and 17.8 g (0.1 mole) of methyltriethoxysilane were allowed to react with 41.4 g (0.9 mole) 96% formic acid, and with heating, 101.2 g of ethanol, ethyl formate and unreacted methyltriethoxysilane and vinyltriethoxysilane were distilled from the reaction mixture. The resulting 126.4 g of vinyl siliconate oligomer was hydrosilylated with 14.3 g (0.087 mole) of triethoxysilane in the presence of 0.1 g Karstedt's catalyst (as in Example 14). The final product, 140.1 g, was clear and colorless after filtration, and 1–2 cstks. viscosity.

Example 17

Following the procedure of Example 14, a mixture of 171.3 g (0.9 mole) of vinyltriethoxysilane and 27.7 g (0.1 mole) of octyltriethoxysilane were allowed to react with 41.4 g (0.9 mole) 96% formic acid, and with heating, 103.7 g of ethanol, ethyl formate and unreacted vinyltriethoxysilane were distilled from the reaction mixture. The resulting 137.9 g of vinyl siliconate oligomer was hydrosilylated with 14.8 g (0.09 mole) of triethoxysilane in the presence of 0.11 g Karstedt's catalyst (as in Example 14). The final product, 150.9 g, was clear and colorless after filtration, and 3–4 cstks. viscosity.

Example 18

Into a 500 ml. three-necked flask was added 177.3 g (0.5 mole) of 1,2-bistriethoxysilylethane, 95.2 g (0.5 mole) vinyltriethoxysilane and 34.5 g (0.75 mole) 96% formic acid. The reaction mixture was heated to reflux temperature and held at for 1 hour. The volatile components (ethanol and ethyl formate) were then distilled from the reaction mixture (80.2 g) yielding 110.9 g of ethylene bridged vinyl siliconate after filtration. The viscosity was 4–5 cstks.

Example 19

Following the procedure set forth in Example 18, 237.9 g (0.5 mole) of bis(3-triethoxysilylpropyl) disulfide, 95.2 g (0.5 mole) vinyltriethoxysilane and 34.5 g (0.75 mole) 96% formic acid were allowed to react. The reaction mixture was heated to refux temperature and held at for 1 hour, followed by distillation of 76.8 g ethyl for mate and ethanol. The resulting yellow product was filtered, producing 295.5 g of material with a viscosity of 1–2 cstks.

Example 20

To 1,142.4 g (6.0 moles) of vinyltriethoxysilane in a two liter three-necked flask was added 5.6 g (0.5 wt.%) of PUROLITE CT-175 sulfonic acid ion exchange resin and 81.0 g (4.5 moles) water. The flask was heated to 80–100° C. with stirring and maintained at this temperature for one hour. Under reduced pressure, 424.6 g of a combination of ethanol and a small amount (about 18 g) of unreacted vinyltriethoxysilane was distilled from the mixture. After cooling the flask contents were filtered, producing 775.1 g clear, colorless vinyl siliconate oligomer of about 1 cstk. viscosity, and containing approximately 11.0 moles of ethoxy groups attached to silicon per kilogram.

Example 21

To 200.0 g of the oligomer of Example 20 (containing approx. 2.2 moles of ethoxy groups) in a 1000 ml. three-necked flask was added 149.0 g (0.8 mole) dodecanol and 0.35 g (0.1 wt. %) of tetraisopropyl titanate catalyst. With stirring the flask contents were heated to 130–140° C., removing 31.2 g of ethanol by distillation. The flask was cooled to 50° C. and 9.4 additional grams of ethanol were distilled under reduced pressure (3 mm Hg). The flask contents were filtered, yielding 305.6 g clear colorless product of 5 cstks. viscosity.

Example 22

To 200.0 g of the oligomer of Example 20 ( containing approx. 2.2 moles of ethoxy groups) in a 1000 ml. three-necked flask was added 298.0 g (1.6 moles) dodecanol and 0.5 g (0.1 wt. %) of tetraisopropyl titanate catalyst. With stirring the flask contents were heated to 125–135° C., removing 60.4 g ethanol by distillation. The flask was cooled to 50° C. and 14 additional grams of ethanol were distilled under reduced pressure (3 mm Hg). The flask contents were filtered, yielding 423.7.0 g clear light yellow product of 14 cstks. viscosity.

Composition Examples

The compositions described below, were each prepared in the following manner. In a "B" BANBURY® mixer, using full cooling water, add EPDM polymer. Ram down mix (RDM) 30 secs. at 116 RPM. Add clay and silane, RDM 30 secs. Add rest of ingredients, except for the RDM 30 secs. Dust down, RDM 20 secs. Dust down, RDM at 155 RPM to 149° C. is reached. Dump the mixer contents and sheet off on a 5×30 cm roll mill using a roll temperature of 80–85° C.

The resulting products were catalyzed by adding the peroxide on the roll mill at 80–85° C. and then cooled to room temperature. Test plaques were made from each rubber compound and cured for 25 minutes at 171° C. The test plaques for each compound were tested for mechanical properties and electrical properties as set forth in Table 1.

The formulations used Table 1 were prepared by incorporating the silanes or oligomers shown in Table 1 into a base formulation as follows, where quantities are given in parts by weight:

100 NORDEL 2722P EPDM (DuPont)
1.5 AGERITE Resin D antioxidant (Vanderbilt)
5 zinc oxide (Zinc Corp.)
5 paraffin wax (International Wax)
5 ERD 90 red lead dispersion (Rhein-Chemie)
2.6 DICUP R peroxide (Hercules)

In Table 1, A-1751 is a state of the art commercial oligomer sold by Witco Corp. as a coupling agent for curable filled elastomer formulations for wire and cable insulation applications, and provided as a comparative example, together with the "none" entry.

TABLE 1

| Oligomer | None | A-1751 | | Ex 18 | Ex 19 | Ex 14 | Ex 17 | Ex 15 | Ex 16 | Ex 22 |
|---|---|---|---|---|---|---|---|---|---|---|
| Physical Properties, cured 20 minutes @ 171° C. | | | | | | | | | | |
| Hardness, Shore A | 84 | 84 | | 87 | 87 | 86 | 88 | 87 | 88 | 86 |
| Elongation, % | 520 | 420 | | 370 | 400 | 350 | 340 | 350 | 310 | 380 |
| 100% Modulus, psi. | 620 | 850 | | 780 | 790 | 830 | 810 | 850 | 840 | 780 |
| 200% Modulus, psi. | 750 | 1210 | | 1260 | 1180 | 1340 | 1330 | 1370 | 1390 | 1270 |
| 300% Modulus, psi. | 870 | 1430 | | 1470 | 1410 | 1660 | 1650 | 1680 | 1720 | 1550 |
| Tensile, psi. | 2190 | 1750 | | 1620 | 1600 | 1710 | 1740 | 1760 | 1750 | 1710 |
| Specific Inductive Capacity @ 60 HZ | | | | | | | | | | |
| As cured | 2.48 | 2.26 | As cured | 2.56 | 2.45 | 2.65 | 2.41 | 2.43 | 2.31 | 2.55 |
| 3 days in 90° C. water | 3.09 | 2.59 | | | | | | | | |
| 14 days in 90° C. water | 3.27 | 2.63 | 17 Days in 90° C. water | 2.62 | 2.43 | 2.58 | 2.44 | 2.44 | 2.31 | 2.57 |
| 28 days in 90° C. water | 3.23 | 2.64 | 34 Days in 90° C. water | 2.65 | 2.48 | 2.60 | 2.45 | 2.46 | 2.28 | 2.58 |
| 55 days in 90° C. water | 3.16 | 2.65 | 48 Days in 90° C. water | 2.64 | 2.47 | 2.60 | 2.44 | 2.46 | 2.27 | 2.58 |
| 83 days in 90° C. water | 3.09 | 2.65 | 92 Days in 90° C. water | 2.64 | 2.47 | 2.61 | 2.45 | 2.47 | 2.50 | 2.60 |
| Power Factor @ 60 HZ | | | | | | | | | | |
| As cured | 0.0022 | 0.0015 | As cured | 0.0014 | 0.0014 | 0.0013 | 0.0011 | 0.0015 | 0.0015 | 0.0013 |
| 3 days in 90° C. water | 0.045 | 0.0024 | | | | | | | | |
| 14 days in 90° C. water | 0.045 | 0.0024 | 17 Days in 90° C. water | 0.0061 | 0.0025 | 0.0031 | 0.0018 | 0.0021 | 0.0021 | 0.0032 |

TABLE 1-continued

| Oligomer | None | A-1751 | | Ex 18 | Ex 19 | Ex 14 | Ex 17 | Ex 15 | Ex 16 | Ex 22 |
|---|---|---|---|---|---|---|---|---|---|---|
| 28 days in 90° C. water | 0.050 | 0.0028 | 34 Days in 90° C. water | 0.0066 | 0.0031 | 0.0033 | 0.0021 | 0.0025 | 0.0023 | 0.0034 |
| 55 days in 90° C. water | 0.053 | 0.0033 | 48 Days in 90° C. water | 0.0056 | 0.0029 | 0.0029 | 0.0029 | 0.0023 | 0.0020 | 0.0029 |
| 83 days in 90° C. water | 0.051 | 0.0051 | 92 Days in 90° C. water | 0.0055 | 0.0028 | 0.0032 | 0.0019 | 0.0022 | 0.0019 | 0.0032 |

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. An oligomer of the formula:

$$[R_3SiO_{1/2}]_m[O_{1/2}SiR_2O_{1/2}]_n[SiO_{3/2}R]_o[SiO_{4/2}]_p$$

wherein
each R is selected individually from the group consisting of B, $R^1$, —$OR^2$, $R^3$ and $R^4$; B is an organosilyl functional group bridged to the Si atom of the siloxane oligomer backbone by a Si—C bond; each $R^1$ is independently a saturated aliphatic hydrocarbon group of 1 to 16 carbon atoms; each $R^2$ is independently a group as defined for $R^1$, an aromatic hydrocarbon group or an acyl group; each $R^3$ is independently a monovalent organic radical containing an aliphatically unsaturated hydrocarbon group and each $R^4$ is a monovalent organic radical linked to the Si atom of the siloxane oligomer backbone by a Si—C bond, which backbone does not include an aliphatically unsaturated hydrocarbon group and which has thereon one or more members of the group selected from aromatic hydrocarbon, ether, ester, carbamate, thioether, polysulfide, blocked mercaptan, amide, epoxy, cyano or oximato groups; and
with the provisos that
at least one half of all R groups are —$OR^2$; either at least one silicon atom of the oligomer has an $R^3$ group thereon or at least one R is a B, or both; if there is a B group, the B group is non-terminal to the oligomer; if there is a group $R^3$ which is a vinyl group, there is at least one other group on the oligomer which is a B group, an $R^3$ group other than vinyl, or an $R^4$ group; m=2 to 20; n=0 to 50; o=0 to 20; p=0 to 10.

2. The oligomer as in claim 1 wherein $R^1$ is methyl; $R^2$ is acetyl, methyl, ethyl, octyl, dodecyl or a mixture thereof and $R^3$ is vinyl, acryloxypropyl, methacryloxypropyl or a mixture thereof.

3. The oligomer of claim 1 wherein m is 2 to 10, n is 0 to 20, o is 0 to 10 and p is 0 to 5.

4. The oligomer of claim 3 wherein m is 2–4, n is 1–15, o is 0–2 and p is 0–1.

5. The oligomer of claim 1 wherein B is a group of the formula,

—A—W wherein W is a silyl group and A is a divalent organic linking group the respective ends of which are bound by Si—C bonds to the group W and to a silicon atom of the oligomer.

6. The oligomer as in claim 5 wherein A is alkylene, alkarylalkylene or alkarylene, or alkylene which is interrupted or substituted by one or more ether, ester, carbamate, isocyanurate, thioether, polysulfide silyl or siloxy groups and W is a silyl group having hydrolyzable functionality, or a silicon linked organosiloxane or polyorganosiloxane group.

7. The oligomer as in claim 1 wherein B is a group of the formula:

—$C_fH_{2f}$—$SiR^1_g(X)_{3-g}$ where f is 2 to 12, g is 0 to 2, X is a hydrolyzable group, and $R^1$ is as previously defined.

8. The oligomer as in claim 7 wherein B is —$C_2H_4Si(OCH_3)_3$; —$C_2H_4Si(OC_2H_5)_3$; —$C_2H_4Si(OCH_3)_2(CH_3)$; —$C_2H_4Si(OCH_3)_2Cl$; —$C_2H_4(C_6H_9)(C_2H_4Si(OCH_3)_3)_2$; —$C_2H_4(C_5H_8)C_2H_4Si(OC_2H_5)_3$; or —$C_2H_4Si(OCH_3)_2(OSi(OCH_3)_3)$.

9. The oligomer of claim 1 wherein at least one $R^3$ group comprises an acryl or methacryl group.

10. The oligomer of claim 1 wherein at least some of the $R^2$ groups are $C_8$ or higher alkyl groups.

11. The oligomer of claim 10 wherein at least some of the $R^2$ groups are $C_{12}$–$C_{16}$ alkyl groups.

12. The oligomer of claim 1 having at least one vinyl group thereon.

13. A hydrolyzate of an oligomer of the structural formula:

$$[R_3SiO_{1/2}]_m[O_{1/2}SiR_2O_{1/2}]_n[SiO_{3/2}R]_o[SiO_{4/2}]_p$$

wherein
each R is selected individually from the group consisting of B, $R^1$, —$OR^2$, $R^3$ and $R^4$; B is an organosilyl functional group bridged to the Si atom of the siloxane oligomer backbone by a Si—C bond; each $R^1$ is independently a saturated aliphatic hydrocarbon group of 1 to 16 carbon atoms; each R2 is independently a group as defined for $R^1$, an aromatic hydrocarbon group of an acyl group; each $R^3$ is independently a monovalent organic radical containing an aliphatically unsaturated hydrocarbon group and each $R^4$ is a monovalent organic radical linked to the Si atom of the siloxane oligomer backbone by a Si—C bond, which backbone does not include an aliphatically unsaturated hydrocarbon group and which has thereon one or more members of the group selected from aromatic hydrocarbon, ether, ester, carbamate, thioether, polysulfide, blocked mercaptan, amide, epoxy, cyano or oximato groups; and
with the provisos that
at least one half of all R groups are —$OR^2$; either at least one silicon atom of the oligomer has an $R^3$ group thereon or at least one R is a B, or both; if there is a B group, the B group is non-terminal to the oligomer, if there is a group $R^3$ which is a vinyl group, there is at least one other group on the oligomer which is a B group, an $R^3$ group other than vinyl, or an $R^4$ group; m=2 to 20; n=0 to 50; o=0 to 20; p=0 to 10.

14. A composition comprising an oligomer or hydrolyzate of an oligomer and a free-radical curing catalyst selected from the group consisting of organic peroxides, azonitrile compounds, sulfur, metal drier compounds and free-radical photoinitiators, and mixtures thereof, the oligomer of the structural formula:

wherein
each R is selected individually from the group consisting of B, $R^1$, —$OR^2$, $R^3$ and $R^4$; B is an organosilyl functional group bridged to the Si atom of the siloxane oligomer backbone by a Si—C bond; each $R^1$ is independently a saturated aliphatic hydrocarbon group of 1 to 16 carbon atoms; each R2 is independently a group as defined for $R^1$, an aromatic hydrocarbon group of an acyl group; each $R^3$ is independently a monovalent organic radical containing an aliphatically unsaturated hydrocarbon group and each $R^4$ is a monovalent organic radical linked to the Si atom of the siloxane oligomer backbone by a Si—C bond, which backbone does not include an aliphatically unsaturated hydrocarbon group and which has thereon one or more members of the group selected from aromatic hydrocarbon, ether, ester, carbamate, thioether, polysulfide, blocked mercaptan, amide, epoxy, cyano or oximato groups; and
with the provisos that
at least one half of all R groups are —$OR^2$; either at least one silicon atom of the oligomer has an $R^3$ group thereon or at least one R is a B, or both; if there is a B group, the B group is non-terminal to the oligomer; if there is a group $R^3$ which is a vinyl group, there is at least one other group on the oligomer which is a B group, an $R^3$ group other than vinyl, or an $R^4$ group: m=2 to 20; n=0 to 50; o=0 to 20; p=0 to 10.

15. A composition as in claim 14 wherein said oligomer includes at least one said B group thereon.

16. The composition of claim 14 or claim 15 further comprising at least one free radically curable monomer, polymer or prepolymer, and optionally an inorganic filler.

17. The composition of claim 16 wherein said polymer is a member of the group consisting of natural rubber, styrene-butadiene rubber, ethylene-propylene copolymers, polyethylene, ethylene-vinyl acetate copolymers, ethylene-propylene terpolymer rubbers in which the third monomeric component is ethylidene norbornene or 1,4-hexadiene, urethane rubbers, polyisobutadiene rubbers and mixtures thereof.

18. The composition of claim 16 wherein the inorganic filler is selected from the group consisting of asbestos, ground glass, kaolin, and other clay minerals, silica, calcium silicate, calcium carbonate (whiting), magnesium oxide, barium carbonate, barium sulfate (barytes), metal fibers and powders, glass, fibers, refractory fibers, titanium dioxide, mica, talc chopped glass, alumina, aluminatrihydrate, quartz, calcium silicate, inorganic coloring pigments and mixtures thereof.

19. A filler treated with an oligomer, or a hydrolyzate thereof, the oligomer of the structural formula:

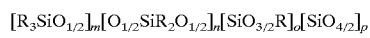

wherein
each R is selected individually from the group consisting of B, $R^1$, —$OR^2$, $R^3$ and $R^4$; B is an organosilyl functional group bridged to the Si atom of the siloxane oligomer backbone by a Si—C bond; each $R^1$ is independently a saturated aliphatic hydrocarbon group of 1 to 16 carbon atoms; each R2 is independently a group as defined for $R^1$, an aromatic hydrocarbon group of an acyl group; each $R^3$ is independently a monovalent organic radical containing an aliphatically unsaturated hydrocarbon group and each $R^4$ is a monovalent organic radical linked to the Si atom of the siloxane oligomer backbone by a Si—C bond, which backbone does not include an aliphatically unsaturated hydrocarbon group and which has thereon one or more members of the group selected from aromatic hydrocarbon, ether, ester, carbamate, thioether, polysulfide, blocked mercaptan, amide, epoxy, cyano or oximato groups; and
with the provisos that
at least one half of all R groups are —$OR^2$; either at least one silicon atom of the oligomer has an $R^3$ group thereon or at least one R is a B, or both; if there is a B group, the B group is non-terminal to the oligomer; if there is a group $R^3$ which is a vinyl group, there is at least one other group on the oligomer which is a B group, an $R^3$ group other than vinyl, or an $R^4$ group; m=2 to 20; n=0 to 50; o=0 to 20; p 0 to 10.

* * * * *